(12) United States Patent
Saito et al.

(10) Patent No.: US 6,714,139 B2
(45) Date of Patent: Mar. 30, 2004

(54) PERIPHERY MONITORING DEVICE FOR MOTOR VEHICLE AND RECORDING MEDIUM CONTAINING PROGRAM FOR DETERMINING DANGER OF COLLISION FOR MOTOR VEHICLE

(75) Inventors: Masaki Saito, Shizuoka (JP); Naoto Ishikawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/756,221

(22) Filed: Jan. 9, 2001

(65) Prior Publication Data

US 2001/0008992 A1 Jul. 19, 2001

(30) Foreign Application Priority Data

Jan. 14, 2000 (JP) ........................................ 2000-005597

(51) Int. Cl.$^7$ ................................................ G08G 1/16
(52) U.S. Cl. ...................... 340/903; 340/436; 340/938; 701/301
(58) Field of Search ................................ 340/903, 904, 340/438, 441, 933, 938, 436; 701/301, 302

(56) References Cited

U.S. PATENT DOCUMENTS

| | | | | |
|---|---|---|---|---|
| 3,737,902 A | * | 6/1973 | O'Hagan et al. | 342/41 |
| 4,313,115 A | * | 1/1982 | O'Sullivan | 342/41 |
| 5,235,316 A | * | 8/1993 | Qualizza | 340/436 |
| 5,249,157 A | * | 9/1993 | Taylor | 340/903 |
| 5,313,201 A | * | 5/1994 | Ryan | 340/961 |
| 5,339,075 A | * | 8/1994 | Abst et al. | 340/903 |
| 5,515,287 A | * | 5/1996 | Hakoyama et al. | 701/301 |
| 5,594,414 A | * | 1/1997 | Namngani | 340/436 |
| 5,598,164 A | * | 1/1997 | Reppas et al. | 342/70 |
| 5,670,963 A | | 9/1997 | Kubota et al. | 342/70 |
| 5,734,336 A | * | 3/1998 | Smithline | 340/903 |
| 5,745,070 A | * | 4/1998 | Yamada | 342/70 |
| 5,761,630 A | | 6/1998 | Sekine et al. | 701/301 |
| 5,767,793 A | * | 6/1998 | Agravante et al. | 340/903 |
| 5,874,904 A | | 2/1999 | Hirabayashi et al. | |
| 5,969,665 A | * | 10/1999 | Yufa | 342/41 |
| 5,995,037 A | * | 11/1999 | Matsuda et al. | 342/71 |
| 6,122,597 A | * | 9/2000 | Saneyoshi et al. | 701/301 |
| 6,133,825 A | * | 10/2000 | Matsuoka | 340/436 |
| 6,169,572 B1 | * | 1/2001 | Sogawa | 348/113 |
| 6,188,949 B1 | | 2/2001 | Hahn et al. | |
| 6,226,389 B1 | * | 5/2001 | Lemelson et al. | 382/104 |
| 6,226,571 B1 | * | 5/2001 | Kai | 701/1 |
| 6,246,961 B1 | * | 6/2001 | Sasaki et al. | 701/301 |
| 6,269,308 B1 | * | 7/2001 | Kodaka et al. | 701/301 |
| 6,327,536 B1 | * | 12/2001 | Tsuji et al. | 701/301 |
| 6,330,511 B2 | * | 12/2001 | Ogura et al. | 701/301 |

FOREIGN PATENT DOCUMENTS

| | | |
|---|---|---|
| DE | 41 15 747 A1 | 11/1992 |
| DE | 197 35 414 A1 | 2/1998 |
| DE | 198 21 803 A1 | 11/1999 |
| EP | 0 020 269 | 12/1980 |
| EP | 0 433 351 B1 | 6/1991 |
| EP | 0 590 588 A1 | 4/1994 |
| EP | 0 817 152 A1 | 1/1998 |
| GB | 2 020 938 A | 11/1979 |
| WO | WO09/02985 A1 | 3/1990 |

OTHER PUBLICATIONS

Electronics Feb.1, 1963 pp. 27–31 "New Air–Traffic System Predicts Flight Paths": SD Moxley and JA Inderhees.
German Office Action dated Nov. 7, 2002, with translation.
Patent Abstracts of Japan, Pub. No. 56034546 A, Apr. 6, 1981.

* cited by examiner

*Primary Examiner*—Toan Ngoc Pham
(74) *Attorney, Agent, or Firm*—Armstrong, Kratz, Quintos, Hanson & Brooks, LLP.

(57) ABSTRACT

The positions of an object on the sideward position of a vehicle are detected at prescribed time intervals. An expected locus of the object is computed on the basis of the positions of the object detected at the prescribed time intervals. An expected locus of the vehicle is also computed. It is determined whether or not there is a danger of collision on the basis of both the expected loci of the object and the vehicle. In this configuration, a periphery monitoring apparatus can be proposed which is capable of determining the danger of collision on the basis of the mutual movements of the vehicle and object.

9 Claims, 9 Drawing Sheets

RIGHT IMAGE

RIGHT IMAGE PROJECTED
ON LEFT IMAGE PLANE

PROJECTED IMAGE SUPERPOSED
ON LEFT IMAGE

LEFT IMAGE-PROJECTED IMAGE
(DIFFERENTIAL IMAGE)

LEFT IMAGE

DIFFERENTIATED IMAGE

OBJECT EDGE IMAGE

PERIPHERY MONITORING DEVICE FOR MOTOR VEHICLE AND RECORDING MEDIUM CONTAINING PROGRAM FOR DETERMINING DANGER OF COLLISION FOR MOTOR VEHICLE

BACKGROUND OF THE INVENTION

1. Field of the Invention

The present invention relates to an periphery monitoring device for a motor vehicle (hereinafter referred to as "in-vehicle periphery monitoring device) and a recording medium containing a program for determining danger of collision for the vehicle. More particularly, the present invention relates to an in-vehicle periphery monitoring device for monitoring an object such as a walker or bicycle on the periphery of the motor vehicle to assist assertion of safety by a driver, and a recording medium containing a processing program for determining the danger of collision between the vehicle and the object by means of a computer.

2. Description of the Related Art

While a driver operates a motor vehicle or car, there is a range out of his filed of view on the periphery of the motor vehicle even if his filed of view is supplemented by a fender mirror or back mirror. Particularly, when he operates a large car such as a truck or bus, he has a wider blind spot. Therefore, for example, when the vehicle having a right handle turns left, the driver cannot find a low object passing by the vehicle such a s a child walking along a sidewalk toward the vehicle, thus leading to an accident or catching or cutting off him. In order to obviate such difficulty, an in-vehicle periphery monitoring device has been proposed which can insure the side field of view using the side image acquired by the camera mounted on a large vehicle such as a bus to carry out the periphery monitoring in turning right or left.

However, when the driver uses the in-vehicle periphery monitoring device, he must eye the display device to make assertion of safety, which is dangerous in the assertion of safety. In order to avoid such danger, the following cutting-off accident preventing device has been proposed. The cutting-off accident preventing device decides whether or not there is an object within a prescribed area in the vicinity of the vehicle on the basis of the image picked up by a camera attached to the side of the vehicle. If "YES", when a handle operation or winker operation is carried out, the cutting-off accident preventing device gives a warning that there is possibility of cutting off the object. This cutting-off accident preventing device makes it unnecessary to verify safety by eyeing and informs the danger of cutting-off by the warning, thereby improving the safety during driving.

Meanwhile, where the object moves like a walker or bicycle, even if there is the object in vicinity of the vehicle, if it moves in the direction leaving from the vehicle, as the case may be, there is no possibility of contact of the vehicle with the object. Conversely, even if there is no object in the vicinity of the vehicle, if the object moves in the direction of approaching the vehicle, there is strong possibility of collision between the vehicle and the object. Namely, the danger of collision between the vehicle and the object does not necessarily depend on only the distance between the vehicle and the object.

However, the above cutting-off accident preventing device only decides the danger of cutting-off or collision in turning left or right according to whether or not there is the object within the prescribed region in the vicinity of the vehicle, and cannot detect the danger of collision accurately.

SUMMARY OF THE INVENTION

In view of the problems as described above, a primary object of the present invention is to provide an in-vehicle periphery monitoring device which can decide the danger of collision between a vehicle and an object on the basis of the relative movements of the vehicle and object.

Another object of the invention is to provide a recording medium containing a processing program for properly deciding the danger of collision between the vehicle and the object.

In order to attain the first object, in accordance with the invention, as seen from the basic structural diagram of FIG. 1, there is provided a periphery monitoring device for a vehicle comprising: object position detecting means $51a$ for detecting positions of an object on the periphery of a vehicle at prescribed time intervals; expected object locus computing means $51b$ for computing an expected locus of the object on the basis of the positions of the object detected by the object position detecting means; expected vehicle locus computing means $51c$ for computing an expected locus of the vehicle; and danger determining means $51d$ for determining whether or not there is a danger of collision between the object and the vehicle on the basis of both the expected loci of the object and the vehicle.

In this configuration, since it is determined whether or not there is a danger of collision between the object and the vehicle on the basis of both the expected loci of the object and the vehicle, the danger can be determined accurately.

Preferably, the periphery monitoring device for a vehicle, further comprises: means for detecting a speed of the object; and means for detecting a speed of the vehicle, wherein the danger determining means determines whether or not there is a danger of collision between the object and the vehicle on the basis of both the expected position of the object computed on the basis of the expected locus and speed of the object and the expected position of the vehicle computed on the basis of the expected locus and speed of the vehicle.

In this configuration, since the danger is determined on the basis of the speed of each of the object and vehicle as well as the loci thereof, the danger can be determined more accurately.

In accordance with this invention, there is provided a periphery monitoring apparatus for a vehicle comprising: object position detecting means having an in-vehicle monitoring means for monitoring the periphery of a vehicle to produce a monitoring signal representative of an environmental condition, the object position detecting means for detecting the positions of an object on coordinates set with respect to the position and monitoring direction of the monitoring means at prescribed time intervals on the basis of the monitoring signal; movement quantity detecting means for detecting the position and movement quantity of the monitoring means in the monitoring direction which moves for a prescribed time while the vehicle moves; expected object locus computing means for computing a real locus of the object on the basis of the positions of the object and the movement quantity of the monitoring means and computing an expected locus of the object on the basis of the real locus of the object; expected vehicle locus computing means for computing an expected locus of the vehicle; and danger determining means for determining whether or not there is a danger of collision between the object and the vehicle on the basis of both the expected loci of the object and the vehicle.

In this configuration, since it is determined whether or not there is a danger of collision between the object and the vehicle on the basis of both the expected loci of the object and the vehicle, the danger can be determined accurately.

In the periphery monitoring apparatus for a vehicle, preferably, the monitoring means is an image pick-up means which produces a plurality of image signals which are obtained by picking up the periphery of the vehicle from two positions apart from each other by a prescribed distance, and the object position detecting means detects the positions of the object on the basis of the plurality of image signals produced from the image pick-up means.

In this configuration, since the image pick-up means monitors the object within a wider range which can be picked up, the danger of collision can be determined more accurately.

It is preferred in the periphery monitoring apparatus for a vehicle that the object position detecting means detects each of a plurality of objects on the coordinates when they are picked up by the image pick-up means; the expected object locus computing means distinguishably computes an expected locus of each of the objects; and danger determining means determines whether or not there is a danger of collision between the object and the vehicle on the basis of both the expected loci of each of the objects and the vehicle.

In this configuration, even there are a plurality of objects, the danger can be determined for each of the objects so that it can be determined more accurately.

The periphery monitoring device for a vehicle, further comprises: means for detecting a speed of the object on the basis of the real locus of the object; and means for detecting a speed of the vehicle, wherein the danger determining means determines whether or not there is a danger of collision between the object and the vehicle on the basis of both the expected position of the object computed on the basis of the expected locus and speed of the object and the expected position of the vehicle computed on the basis of the expected locus and speed of the vehicle.

In this configuration, since the danger is determined on the basis of the speed of each of the object and vehicle as well as the loci thereof, the danger can be determined more accurately.

Preferably, the periphery monitoring apparatus for a vehicle further comprises waning means for issuing a warning when the danger determining means determines that there is a danger.

In this configuration, a driver is beforehand informed of the danger of collision.

The periphery monitoring apparatus for a vehicle, further comprises: collision expected time computing means for computing an expected collision time on the basis of the expected position of the object and the expected position of the vehicle when the danger determining means determines that there is a danger; and warning issuing means for issuing multi-step warnings according to the collision expected time.

In this configuration, the driver can be beforehand informed of the degree of danger of collision.

In accordance with the second aspect of the invention, there is provided a recording medium containing a processing program for determining a danger of collision of a vehicle and an object by a computer, the processing program to be executed by the comprising the steps of: detecting positions of an object on the periphery of a vehicle at prescribed time intervals; computing an expected locus of the object on the basis of the positions of the object detected by the object position detecting means; computing an expected locus of the vehicle; and determining whether or not there is a danger of collision between the object and the vehicle on the basis of both the expected loci of the object and the vehicle. Further, there is provided a recording medium containing a processing program for determining a danger of collision of a vehicle and an object by a computer, the processing program to be executed by the computer comprising the steps of: acquiring a monitoring signal representative of an environmental condition produced from an in-vehicle monitoring means for monitoring the periphery of a vehicle; detecting the positions of an object on coordinates at prescribed time intervals on the basis of the monitoring signal; detecting the position and movement quantity of the monitoring means in a monitoring direction which moves for a prescribed time while the vehicle moves; computing a real locus of the object on the basis of the positions of the object and the movement quantity of the monitoring means; computing an expected locus of the object on the basis of the real locus of the object; computing an expected locus of the vehicle; and determining whether or not there is a danger of collision between the object and the vehicle on the basis of both the expected loci of the object and the vehicle.

In these configurations according to this aspect, since it is determined whether or not there is a danger of collision between the object and the vehicle on the basis of both the expected loci of the object and the vehicle, the danger can be determined accurately.

The above and other objects and features of the invention will be more apparent from the following description taken in conjunction with the accompanying drawings.

DESCRIPTION OF THE PREFERRED EMBODIMENTS

Figure 1:
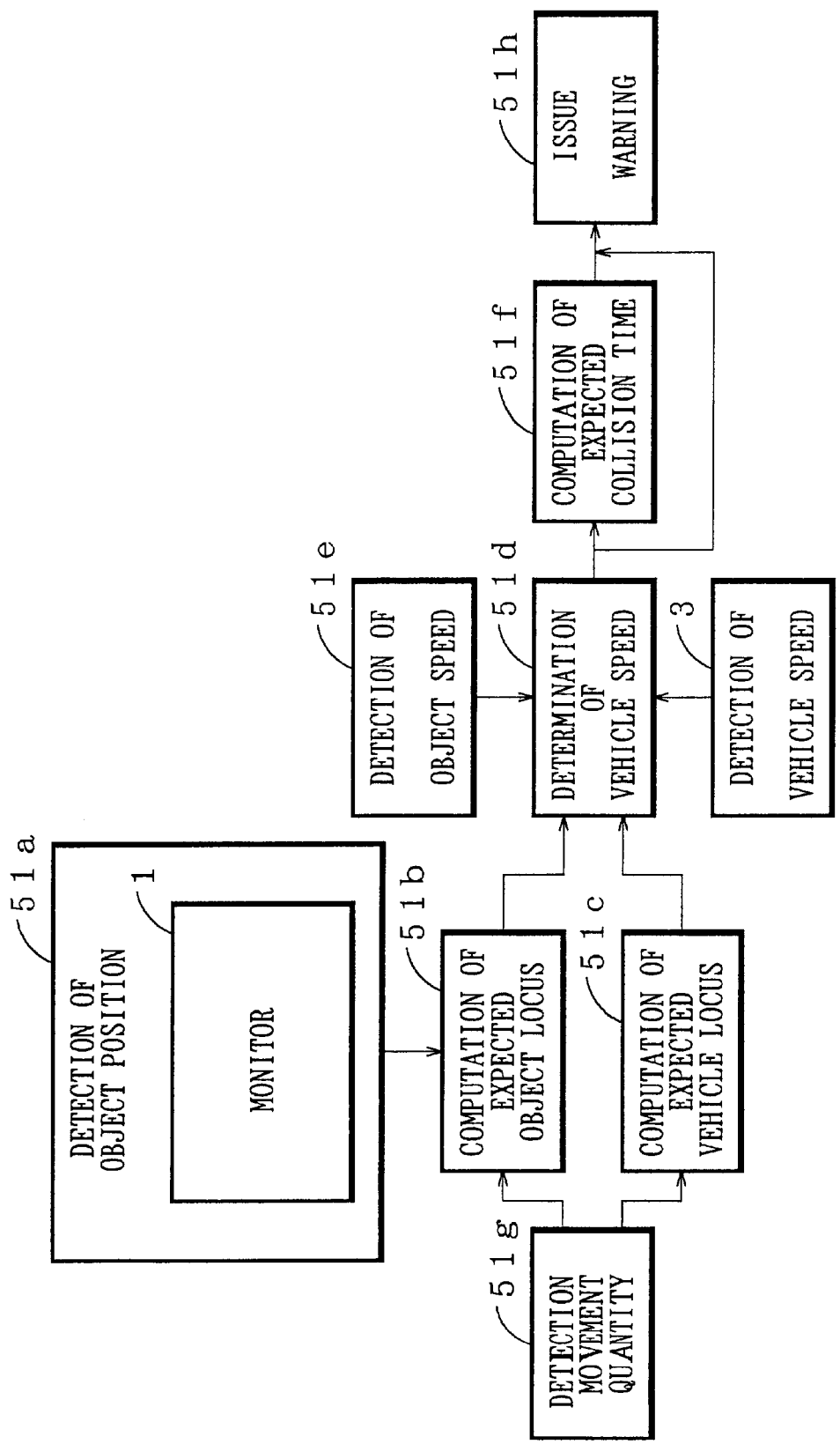
FIG. 1 is a block diagram showing a basic configuration of an in-vehicle side monitoring device according to the present invention.

Referring to the drawings, an explanation will be given of an embodiment of the present invention.

Figure 2:
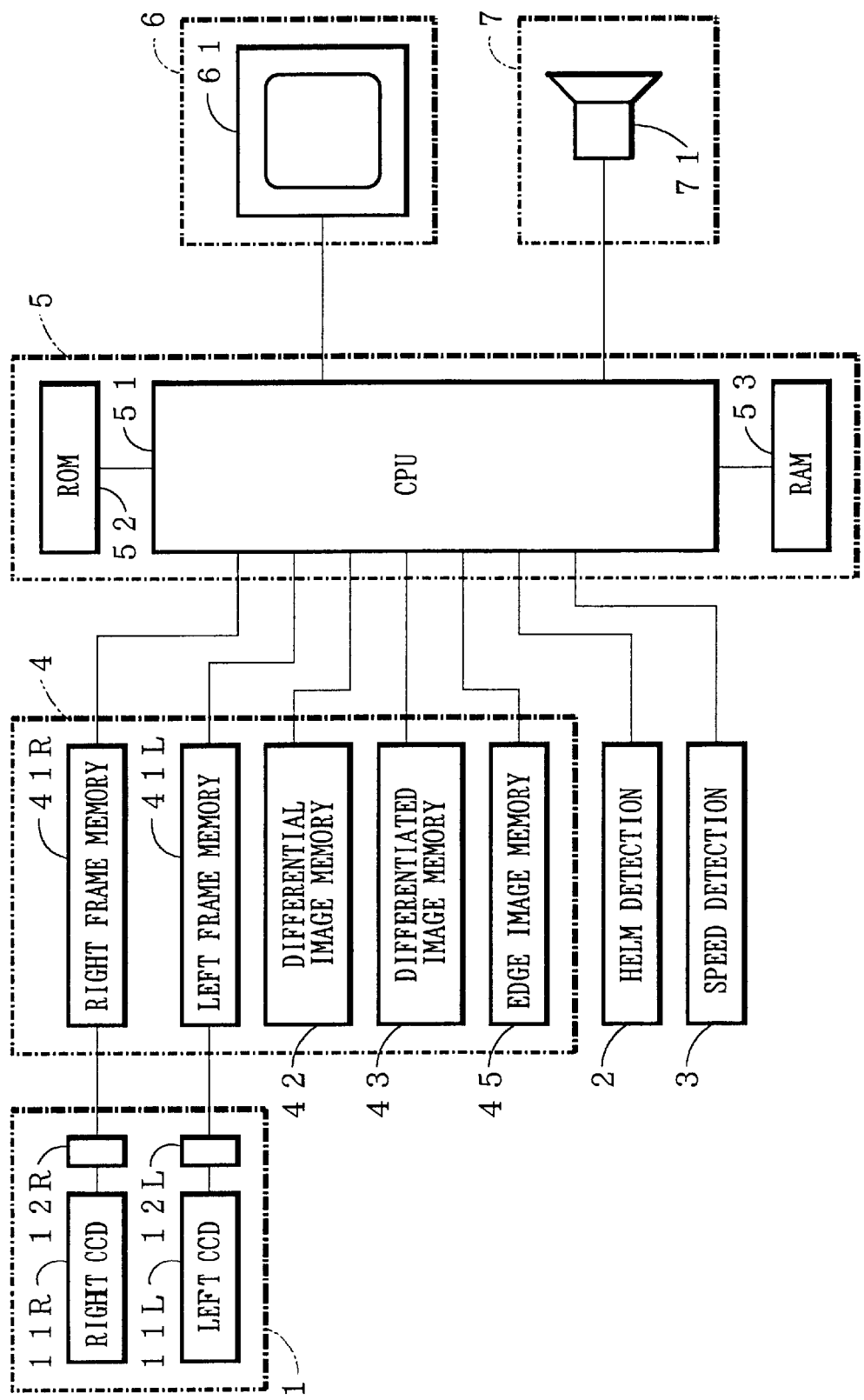
FIG. 2 is a block diagram showing an embodiment of the in-vehicle side monitoring device according to the invention.

FIG. 2 shows the in-vehicle periphery monitoring device according to the present invention. In FIG. 2, reference numeral 1 denotes an image pick-up unit mounted in a vehicle to monitor the periphery of a vehicle; 2 denotes a helm detecting unit for detecting turning information of the vehicle; 3 a speed detecting unit for detecting the speed of the vehicle; 4 a storage unit for storing image information and others; 5 a microcomputer ($\mu$COM); 6 a display unit; and 7 a sound unit for issuing warning sound or audio guidance.

Figure 3:
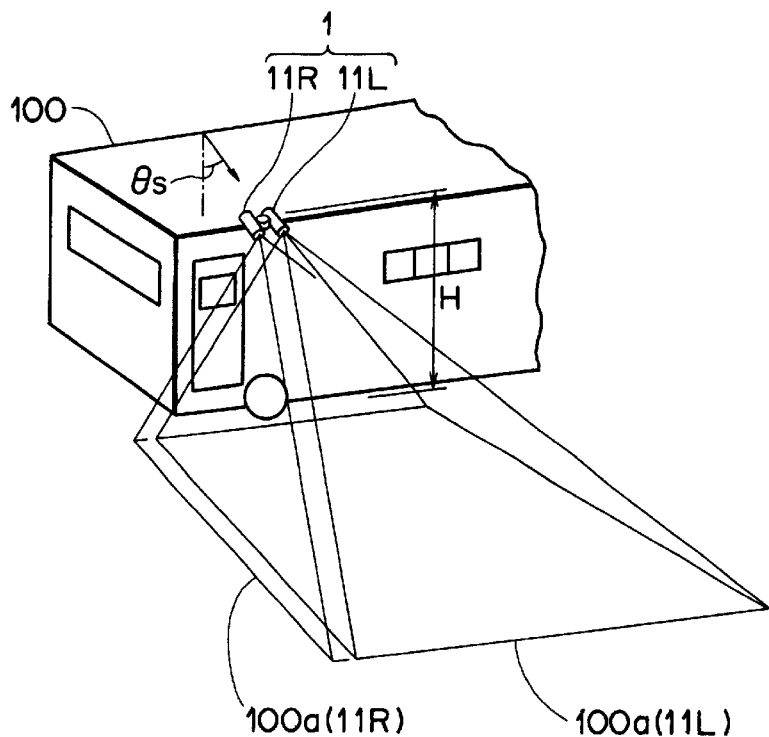
FIG. 3 is a perspective view of the manner in which a camera is mounted according to the embodiment of the invention.

The image pick-up unit 1 includes a right CCD camera (image pick-up means) 11R, a left CCD camera (image pick-up means) 11L, a right image plane 12R on which the image information picked up by the right CCD camera 11R is projected and a left image plane 12L on which the image information picked up by the left CCD camera 11L is projected. As shown in FIG. 3, the image pick-up unit 1 is located at the position of height H at the front sideward position of the vehicle 100 so that it is oriented outwardly from the vehicle. The pair of CCD cameras 11 constituting the image pick-up unit 1 are located in parallel apart from each other by a prescribed distance at an angle $\theta$s of depression. Therefore, the image pick-up unit 1 picks up the a monitoring region 100a [100a(11R) and 100a(11L)] in the front sideward area of the vehicle.

The helm detecting unit 2 includes a handle helm sensor for detecting the rotating quantity and direction of the handle and a steering angle sensor for detecting the steering angle of a steering wheel (generally front wheel) (both sensors are not shown), and produces turning information inclusive of the turning direction of a vehicle and steering angle detected by these sensors. The speed detecting unit 3 may be a driving sensor (not shown) which produces a pulse signal whenever the vehicle runs by a unit distance to provide a vehicle speed computed on the basis of the pulse signal as speed information.

The storage unit 4 includes a right frame memory 41R for temporarily storing, as a right image signal, the image information projected on the right image plane 12R of the image pick-up unit 1; a left frame memory 41L for temporarily storing, as a left image signal, the image information projected on the left image plane 12L of the image pick-up unit 1; a differential image memory 42 for storing a differential image; a differentiated image memory 43 for storing a differentiated image; and an edge image memory 44 for storing an edge image (the differential image, differentiated image and edge image will be described later). These memories 41 to 45 are constructed in a matrix with m rows and n columns, e.g. as a array of 512 (m)×512 (n) pixels. Each of the pixels constituting the memory contains luminance data with e.g. 256 levels of gray.

The $\mu$COM 5 includes a ROM 52 which is a recording medium which stores an operation program for deciding the danger of collision between the vehicle and object, a CPU 51 which operates according to the operation program and a RAM 53 for temporarily storing the information required when the CPU 51 operates. The display unit 6 has a display 61 on which the image picked up by the camera 11 or message for a driver is displayed on the basis of the displaying image signal supplied from the CPU 51. The sound unit 7 issues buzzer sound or audio guidance from a speaker 71 on the basis of the buzzer sound signal or audio guidance supplied from the CPU 51.

The CPU 51 within the $\mu$COM 5 performs processing of detecting, every prescribed times $\Delta$t's, the position of an object on the coordinates set with respect to the position of the CCD camera on the basis of the image signals stored in the right frame memory 41R and left frame memory 41L of the image pick-up unit 1 (object position detecting means), processing of detecting the position and the movement quantity of the CCD camera 11 in a monitoring direction on the basis of the moving locus of the CCD camera 11 which moves during the prescribed time (movement quantity detecting means), processing of computing the real locus of the object on the basis of the positions of the object detected at two timings at the interval of the prescribed time $\Delta$t and movement quantity detected by the movement quantity detecting means and computing the expected locus of the object on the basis of the real locus thus computed (expected object locus computing means), and processing of detecting the speed of the object on the basis of the real locus of the object thus expected, and processing of computing the expected positions of the object after $\Delta$t1, $\Delta$t2 . . . $\Delta$tn on the basis of the expected object locus and the object speed.

The CPU 51 performs processing of computing a vehicle expected locus on the basis of the turning information from the helm detecting unit 2 (expected vehicle locus computing means), processing of computing the expected positions of the vehicle after $\Delta$t1, $\Delta$t2 . . . $\Delta$tn on the basis of the expected vehicle locus and the speed information supplied from the speed detecting unit 3, processing of determining whether or not there is danger of collision between the vehicle and object on the basis of the expected object position and the expected vehicle position (danger determining means) and processing of issuing a warning when it is decided that there is danger of collision (warning issuing means).

Now referring to the flowchart of FIG. 4, an explanation will be given of the operation of the in-vehicle periphery monitoring device having a configuration described above.

CPU 51 starts to operate when the ignition switch (not shown) is turned on. In an initial step (not shown), initial settings are made for the respective areas of the $\mu$COM 5. Thereafter, the processing proceeds to initial step S1.

In step S1, the image signal picked up by the image pick-up unit 1 at timing t is once projected on the image planes 12R and 12L and are stored in the right frame memory 41R and the left frame memory 41L as the luminance data for each of the pixels. In step S2, processing of detecting the presence/absence of an object is performed on the basis of the image signal stored in step S1.

In step S3, it is decided whether or not the presence of the object has been detected in step S2. If YES (there is the object), the processing proceeds to step S4. In step S4, processing of detecting the position of the object on the coordinates set with respect to the position of the CCD camera 11 is performed. If NO in step S3, the processing proceeds to step S6.

Now, a detailed explanation will be given of the processing of detecting the presence/absence of the object in step S2 and the processing of detecting the object position in step S4. In the processing of detecting the presence/absence of the object, CPU 51 performs removal of a background image (image at height of "0") and creation of an edge image of the object. For the purpose of facilitating the explanation of these kinds of processing, the processing of detecting the object in step S4 will be first explained.

Figure 5:
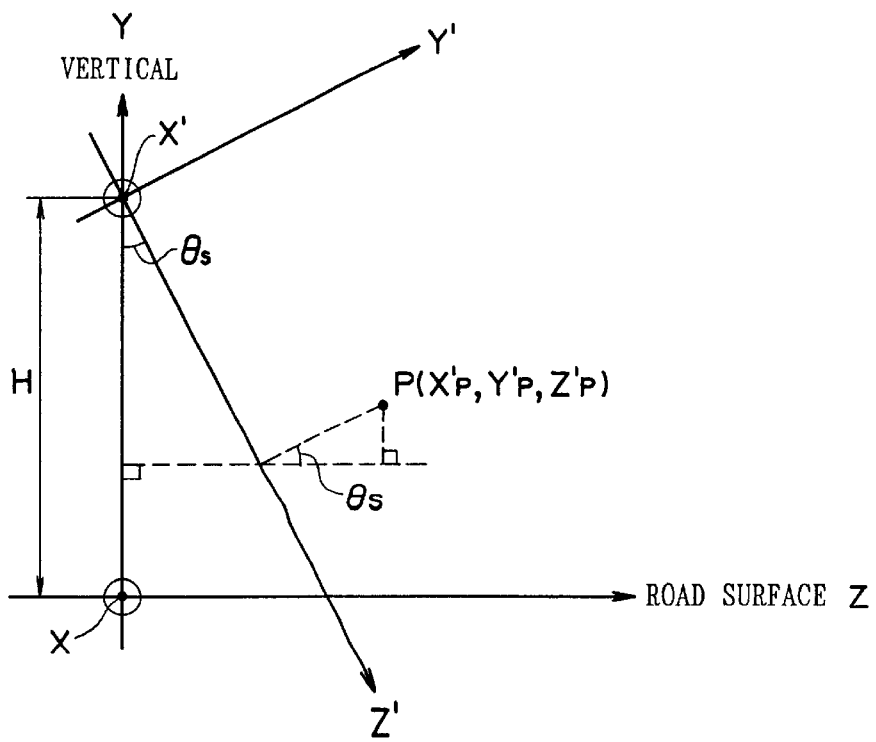
FIG. 5 is a view for explaining the correction of a depression angle of the camera according to this embodiment.

The image pick-up unit 1, i.e. CCD cameras 11, as explained in connection with FIG. 3, is installed at the depression angle of $\theta$s at the front sideward position of the vehicle, picks up the monitoring area 100a. Therefore, the image picked up by the image pick-up unit 1 is an image taken with respect to its location. Thus, the position of the object is taken with respect to its location of the image pick-up unit. As understood from the above explanation, the image pick-up unit 1 mounted in the vehicle serves as a monitoring means which monitors the periphery of the vehicle and also produces the signal indicative of the position of the object on the coordinates set with respect to the location of the image pick-up unit 1 (referred to as "camera position"). For the sake of explanation, as shown in FIG. 5, the coordinates set with respect to the above location are represented by X', Y' and Z', while those on the road are represented by X, Y and Z.

Figure 6A:
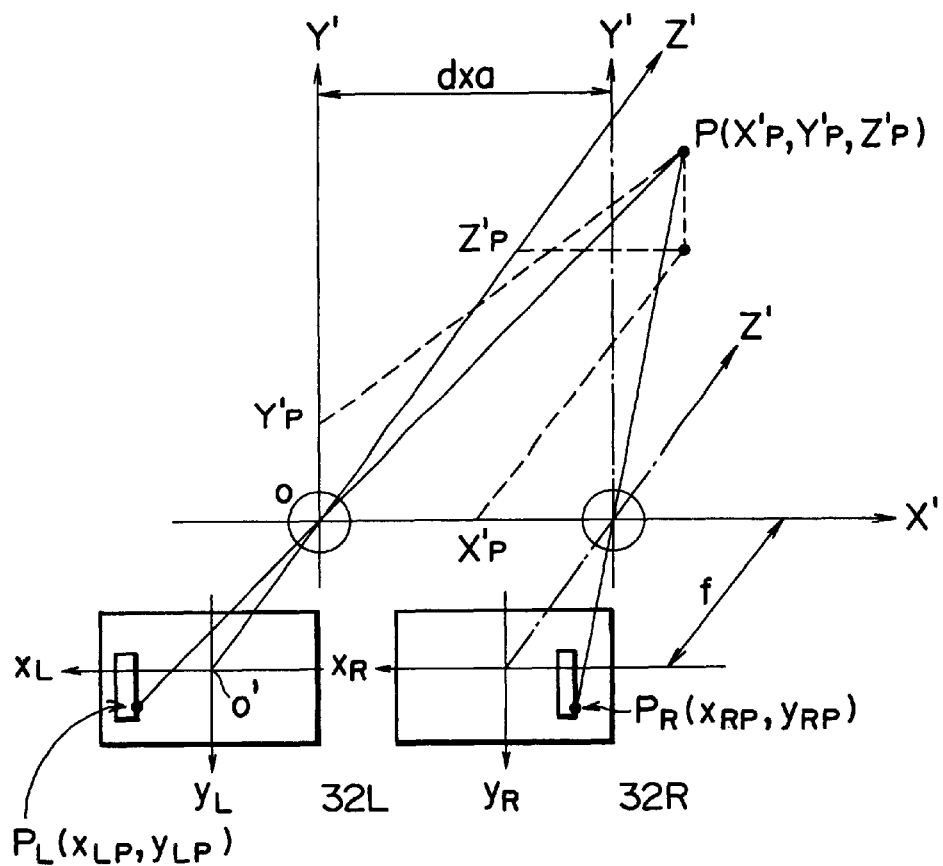
FIGS. 6A and 6B are views for explaining the measurement of a three-dimensional position according to this embodiment.

On the X'Y'Z'-coordinate system, as seen from FIG. 6A, the Z'-axis is defined as a lens optical axis of each of the CCD cameras 11; the X'-axis is defined as an axis in parallel to the road surface; and the Y'-axis is defined as an axis orthogonal to both Y' and Z' axes. Therefore, the right CCD camera 11R and left CCD camera 11L are arranged so that their lens optical axes are coincident with the Z'-axis. With respect to the X'-axis, the CCD cameras 11 are arranged so that their center points are located on the X'-axis apart from each other by a prescribed distance dXa. For the purpose of facilitating the following explanation, the origin O of the X', Y' and Z' axes is defined as the center of the lens of the left CCD camera 11R.

The point P ($X_P'$, $Y_P'$, $Z_P'$) on the object picked-up by the CCD cameras 11 is held as $P_R(x_{RP}, y_{RP})$ in the right frame memory 41R and held as $P_L(x_{LP}, y_{LP})$ in the left frame memory 41L. The Z' coordinate $Z_P'$ of the point P can be acquired in similarity of a triangle as seen from the schematic view of the X'Z' plane in FIG. 6B. Namely, the coordinate $Z_P'$ can be expressed by Equation (1)

$$Z_P' = dxa \cdot f/(x_{LP} - x_{RP}) \tag{1}$$

where dxa is a distance between both lenses f is a focal distance of each lens

Figure 6B:
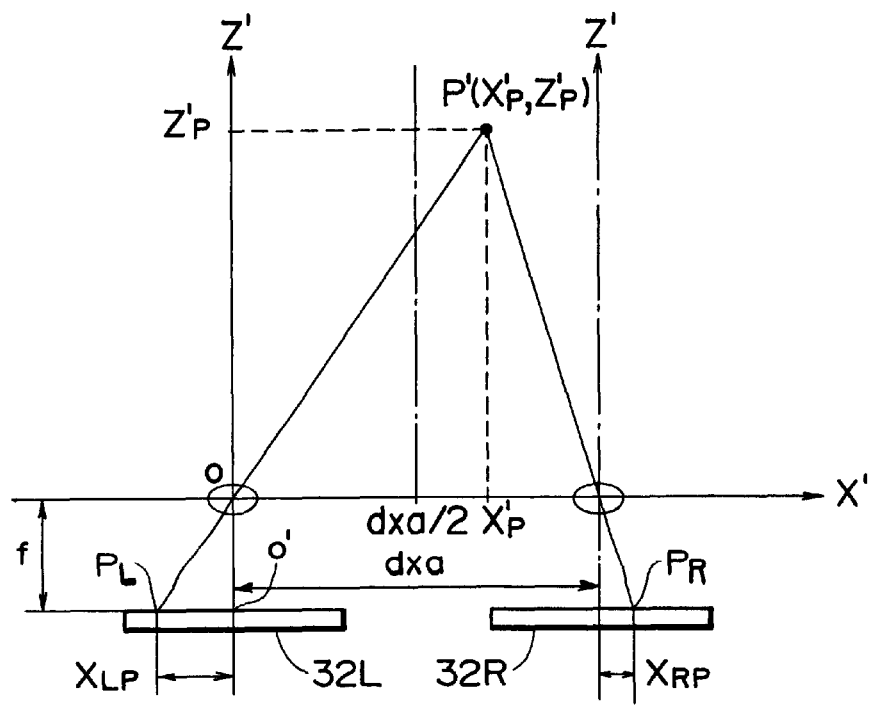

Likewise, the X' coordinate $X_P'$ of the point P can be also acquired in similarity of a triangle as seen from the schematic view of the X'Z' plane in FIG. 6B. The Y' coordinate $Y_P'$ of the point P can be also acquired similarly on the assumption of the Y'Z' plane not shown. Thus, the X' coordinate $X_P'$ and the Y' coordinate $Y_P'$ can be expressed by Equations (2) and (3), respectively.

$$X_P' = Z_P' x_{LP} / f \tag{2}$$
$$= dxa \cdot x_{LP}/(x_{LP} - x_{RP})$$

$$Y_P' = Z_P' y_{LP} / f \tag{3}$$
$$= dxa \cdot y_{LP}/(x_{LP} - x_{RP})$$

Incidentally, with respect to the coordinate $X_P'$, if the standard coordinates are set between the right CCD camera 11R and the left CCD camera 11L, a difference between the coordinate $X_P'$ calculated by Equation (2) and ½ of the distance of the distance dxa between both lenses may be taken.

Since the point P ($X_P'$, $Y_P'$, $Z_P'$) in the X'Y'Z' coordinate system calculated by Equations (1) to (3) represents the coordinate value on the coordinate system set with respect to the camera position, this coordinate value must be converted into that in the XYZ coordinate system on the road surface. In this case, assuming that the depression angle of the image pick-up unit 1 (CCD cameras 11) is $\theta_S$, the relationship between the coordinate ($X_P'$, $Y_P'$, $Z_P'$) of the point P in the X'Y'Z' coordinate system and the XYZ coordinate system set with respect to the road surface is set as shown in FIG. 5.

Thus, the coordinates ($Z_P'$, $Y_P'$, $X_P'$) calculated by Equations (1) to (3) can be converted into the coordinate ($X_P$, $Y_P$, $Z_P$) by implementing the following Equations (4) to (6).

$$X_P = X_P' \tag{4}$$

$$Y_P = H - Z_P' \cos \theta_S + Y_P' \sin \theta_S \tag{5}$$

$$Z_P = Z_P' \sin \theta_S + Y_P' \cos \theta_S \tag{6}$$

On the basis of Equations (1) to (6), an explanation will be given of the processing of detecting the presence/absence of the object by CPU 51 in step S2. First, removal of a background image (the image at height of 0) will be explained.

Figure 7A:
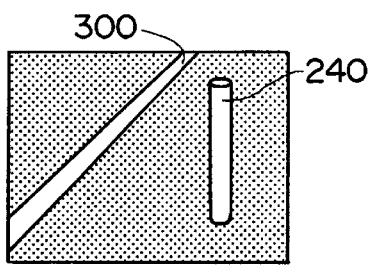
FIGS. 7A to 7D are views for explaining the removal of a road surface image.

FIG. 7A shows the right image picked up by the right CCD camera 11R and held in the right frame memory 41R. In FIG. 7A, reference numeral 300 denotes a white line and reference numeral 240 denotes a pole-like object.

Figure 7B:
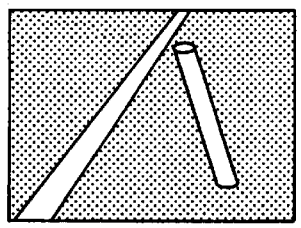

Now, it is assumed that the entire right image held in the right frame memory 32R is the image at a height of 0, i.e. the image drawn on the road surface. On the basis of the right image thus assumed, it is converted into the image picked up (projected) at the position of the left CCD camera 11L (FIG. 7B).

The processing of conversion into the projected image will be explained. It is assumed that the point $P_L(x_{LP}, y_{LP})$ of the projected image corresponding to the point $P_R$ of the right image ($x_{RP}, y_{RP}$) is $P_L$ ($x_{LP}, y_{LP}$). As seen from FIG. 3, assuming that the X' axis relative to the camera and the X-axis relative to the road surface are in parallel and x-axes of the scanning lines to be picked up by the cameras ($x_L$ axis and $x_R$ axis in FIG. 6) are also in parallel, the $y_L$ value and $y_R$ value of the image when the same object has been picked up are equal to each other. Further, assuming that the entire image is on the road, the value of $Y_P$ in Equation (6) becomes zero. This leads to the following equations (7) and (8).

By substituting $Z_P'$ and $Y_P'$ in Equation (1) and $Y_P'$ in Equation (3) into $Z_P'$ and $Y_P'$ in Equation (8), $X_{LP}'$ can be acquired as expressed by Equation (9), $$y_{LP} = y_{RP} \tag{7}$$

$$0 = HP - ZP' \cos \theta_s + YP' \sin \theta_s \tag{8}$$

$$X_{LP} = (dxa \cdot f \cos \theta_s + dxa \cdot y_{RP} \sin \theta_s)/H + x_{RP} \tag{9}$$

By computing Equations (8) and (9), µCOM 5 creates the projected image (FIG. 7B).

Figure 7C:
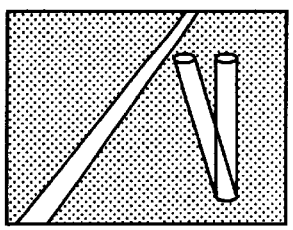
Figure 7D:
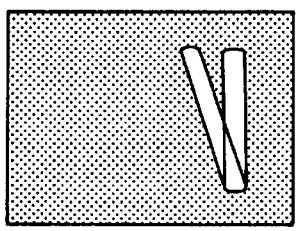

Superposition of the projected image thus created on the left image creates an image as shown in FIG. 7C. Namely, where the right image picked up by the right CCD camera 11R is superposed on the left image plane, the pattern inclusive of a white line drawn on the road surface is coincident to that picked up by the left CCD camera 11L in their position and luminance, and a difference increases as the location of the object becomes high from the road surface. When the difference between the left image data and projected image data is taken, the luminance of each of the pixels constituting the road surface other than those of the object becomes zero or a value approximate to zero. Assuming that values not larger than a prescribed threshold value are zero, all the pixels take the value of zero. In this way, in the differential image when the difference between the left image data and projected image data is taken, as shown in FIG. 7D, the road surface image (background image at the height of 0) is removed and only the portion having some height is taken as having the values other than 0. The differential image is stored in the differential image memory 42 in the storage section 4.

Thus, the background image having the height of 0 is removed, and only the image of the object having the height can be extracted. Subsequently, the processing of edge extraction will be carried out for the object image thus extracted in the manner described below.

The processing of edge extraction is carried out on the basis of the image information stored in the left frame memory 41L. On the left image stored in the left frame memory 41L, The luminance values Im,n of the image data in a matrix with m rows and n columns are scanned in the horizontal direction, i.e. X'-axis direction in FIG. 6. Computing Equation (10) provides a differentiated image.

If $|I_{m,n+1} - I_{m,n}| \geq E_0$ $E_{m,n} = 1$

If $|I_{m,n+1} - I_{m,n}| < E_0$ $E_{m,n} = 0$

Where $E_0$ is a threshold value (10)

Figure 8A:
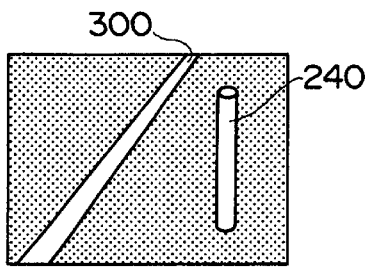
FIGS. 8A to 8C are views for explaining the detection of an object edge according to this embodiment.
Figure 8B:
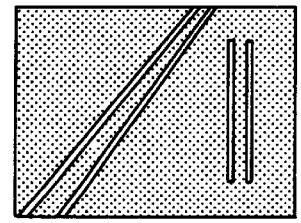

The differentiated image, as shown in FIG. 8B, results in an image with longitudinal edge portions of "1" and with the remaining portion of "0". The differentiated image is stored in the differentiated image memory 43 of the storage unit.

Figure 8C:
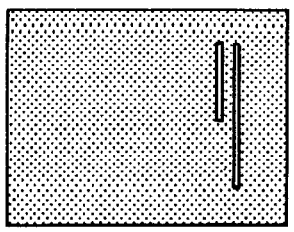

The differentiated image thus acquired (FIG. 8B) and the differential image held in the differential image memory 42 (acquired by the processing of removal of the road surface image) are superposed to make their AND. Thus, the image of the object edge with only the extracted edge portion of the object as shown in FIG. 8C is created. The object edge image is stored in the edge image memory 35.

Figure 4:
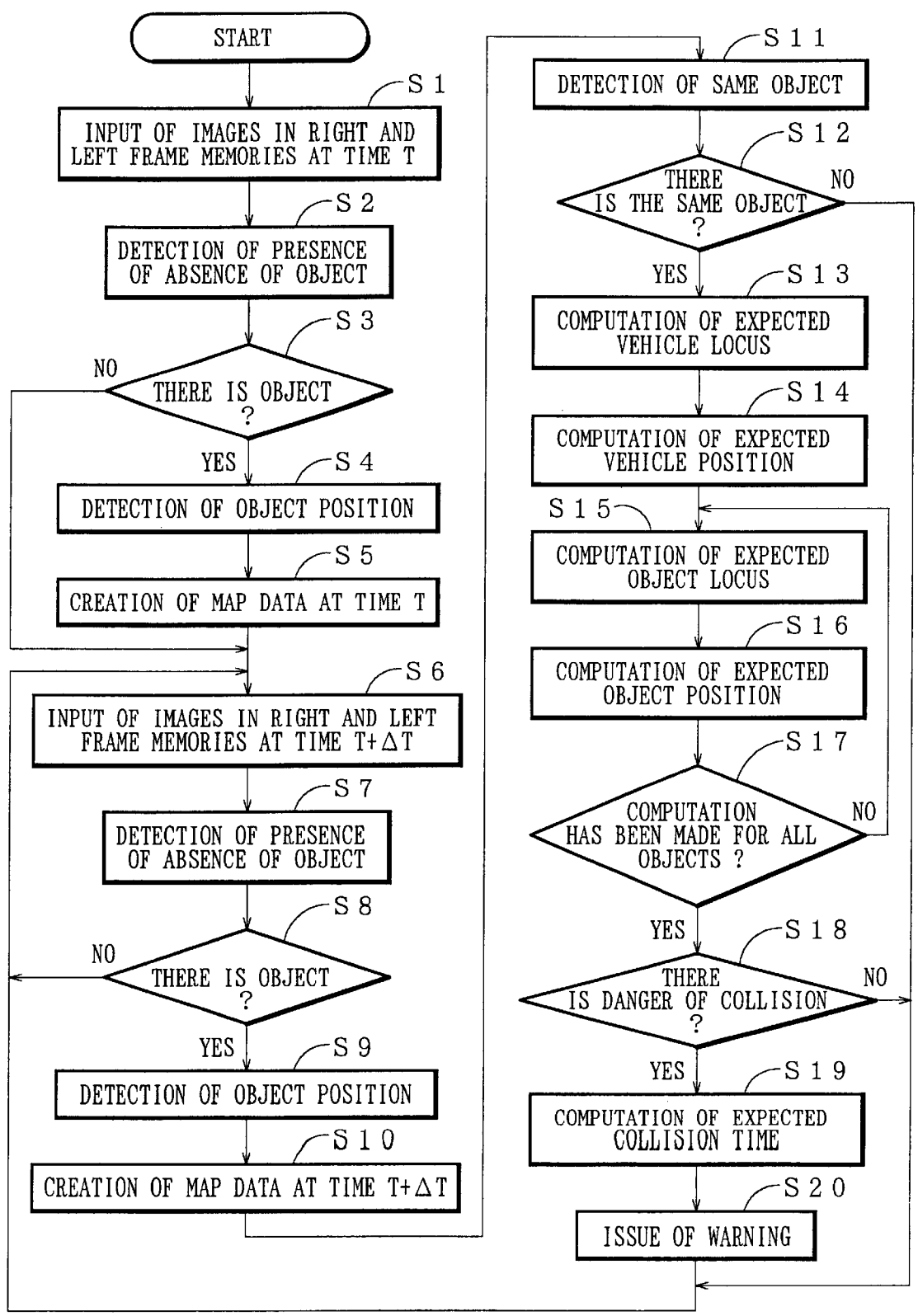
FIG. 4 is a flowchart showing the processing procedure in a CPU constituting the in-vehicle shown in FIG. 2.

Returning to the processing of FIG. 4, in step S3, it is decided whether or not the object has been detected according to whether or not the object edge image has been created. Namely, if the object is picked up by the pick-up unit 1 and the object edge image corresponding to the object thus picked up is created, the processing proceeds to step S4. On the other hand, if the object is not picked up by the pick-up unit 1 and hence the object edge image is not created, the processing immediately proceeds to step S6. In step S4, using Equations (4) to (6), the edge points of the created object edge image is transformed into the coordinates in the XYZ coordinate system on the road surface. The coordinates are stored in the RAM 53. The processing proceeds to step S5.

Figure 9A:
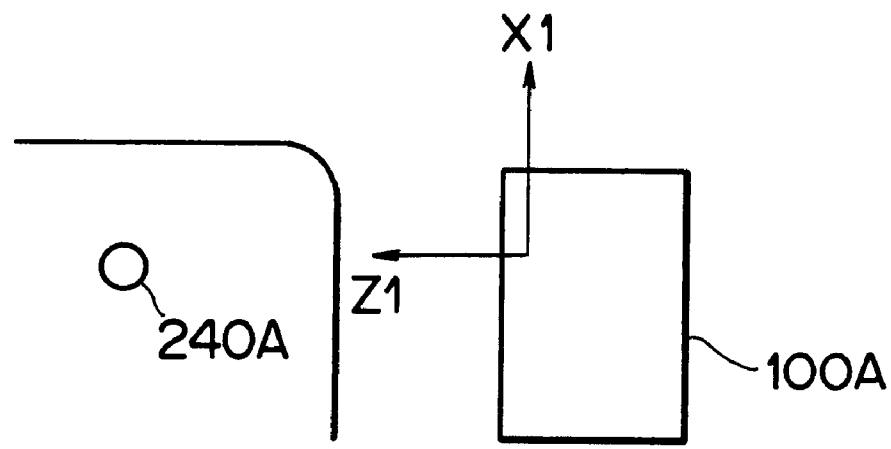
FIGS. 9A and 9B are views for explaining the operation of the CPU.

In step S5, at a timing t as shown in FIG. 9A, the map data representative of the positional relationship is created between the vehicle 100A and object 240A on the X1Z1 coordinate system on the road surface relative to the CCD cameras 11. The map data are stored in the RAM 53.

The processing proceeds to steps S6 and S7. After a prescribed time Δ from the timing of step S1 or step S6 carried out previously, the same processing as in the above steps S1 and S2 is repeated to detect the presence or absence of the object. In step S8, it is decided whether or not the object has been detected in the processing of detecting the presence or absence of the object in step S7. If YES, the processing proceeds to step S9. On the other hand, if NO in step S8, it is determined that there is no danger of collision between the object and the vehicle, the processing returns to step S6.

Figure 9B:
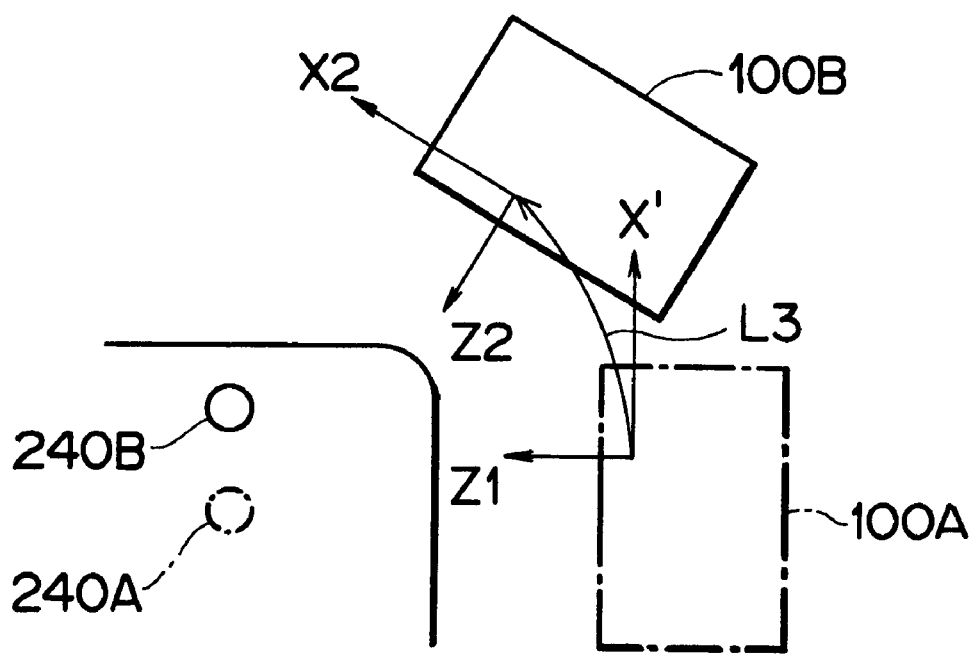

In step S9, the same processing as in step S4 is carried out. At a timing t+Δ as shown in FIG. 9B, the position of The object 240B on the X2Y2 coordinate system relative to the CCD cameras 11 mounted in the vehicle 100B is computed and stored in the RAM 53. In step S10, on the basis of the turning information from the helm detecting unit 2 and the speed information from the speed detecting unit 3, the moving locus L3 of the CCD camera 11 which has moved during the prescribed time Δt according to the driving of the vehicle is also detected. On the basis of the moving locus L3, the position of the CCD cameras 11 and their movement quantity in the monitoring direction is detected. Incidentally, when the CCD cameras are turned according to the turn such as the left turn or right turn of the vehicle, the movement quantity must be acquired taking the turning angle in consideration.

On the basis of the movement quantity thus acquired and the position of the object 240B on the X2Z2 coordinate system, the map data representative of the positional relationship between the vehicle 100B and object 240B on the X1Z1 coordinate system are created. The map data are stored in the RAM 53.

In step S11, processing of detecting the same object is carried out. This processing is referred to as taking the correlation between the object detected at timing t and the object detected at timing t+Δt. In this processing, the object image representative of the object 240A picked up at timing t is checked against that representative of the object 240B. If both images match with each other, it is determined that both object 240A and 240B are the same object. Incidentally, while a plurality of objects are picked up by the CCD cameras, the processing of detecting the same object will be implemented for each of the plurality of objects.

Figure 10A:
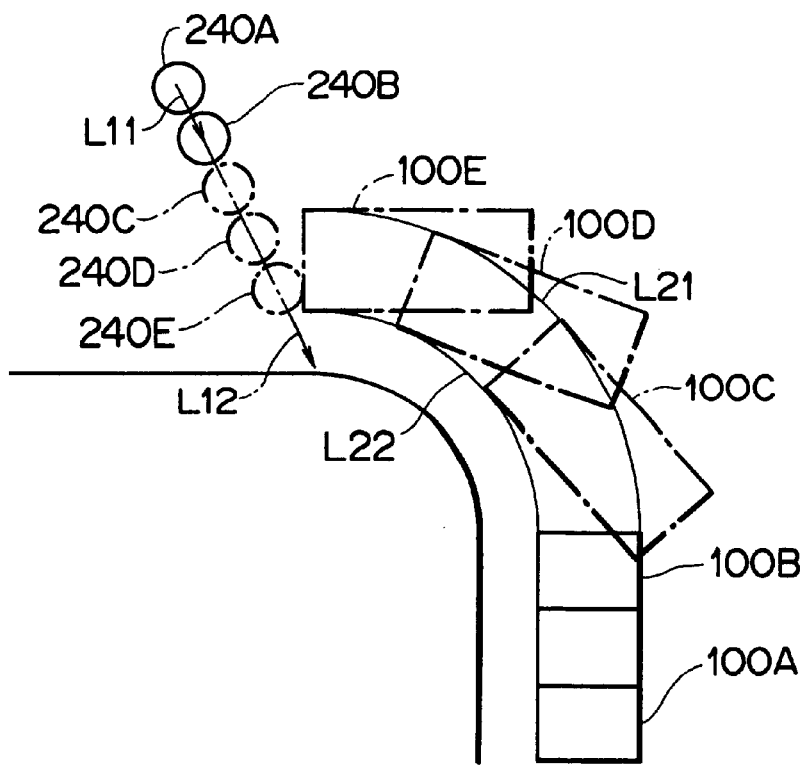
FIGS. 10A and 10B are views for explaining the decision of danger carried out by the CPU.

In step S12, it is decided whether or not there is the same object in the processing of detecting the same object. If NO, the processing returns to step S6. If YES, the processing proceeds to step S13. In step S13, processing of computing an expected inner wheel locus L22 and an expected outer wheel locus L22 is performed on the basis of the turning information from the helm detecting unit 2 as shown in FIG. 10A. Subsequently, in step S14, on the basis of the speed information from the speed detecting unit 3 and the expected loci L22 and L21, the expected positions of the vehicle 100C, 100D, 100E, . . . after ΔT1, ΔT2, ΔT3, . . . are computed and stored in the RAM 53.

In step S15, processing of computing an expected object locus is carried out. Specifically, the real locus L11 of the object is computed on the basis of the positions of the objects 240A and 240B detected at a prescribed time interval Δt which can be regarded the same object as shown in FIG. 10A, and the locus L11 thus computed is extended to compute an expected object locus L12.

In step S16, processing of computing an expected object position is carried out. Specifically, the distance of the real object locus L11 acquired in step S15 is divided by a prescribed time Δt to obtain an object speed. On the basis of the speed thus obtained and the expected object locus L12, the expected positions 240C, 240D, 240E, . . . ΔT1, ΔT2, ΔT3, . . . are computed and stored in the RAM 53. The processing by CPU 51 proceeds to step S17.

In step S17, it is decided whether or not the expected object loci have been computed for all the objects correlated in the processing of detecting the same object in step S11. If NO, the processing from step S15 to step S16 is repeated. Thus, the expected object positions are computed for all the objects. By repeating the processing from step S15 to S16, the expected locus and hence expected position of each of the objects which may be detected in the processing of detecting the object positions in S4. If YES in step S17, the processing proceeds to step S18.

Figure 10B:
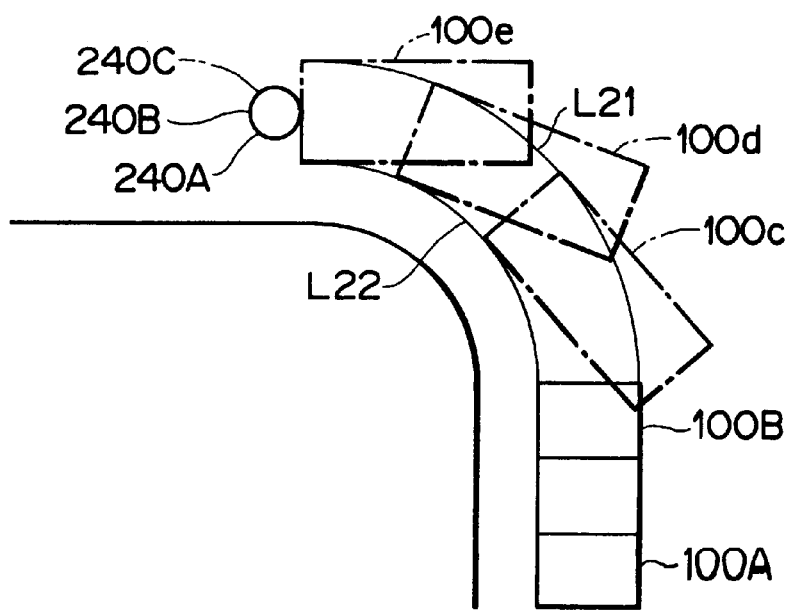
Figure 11A:
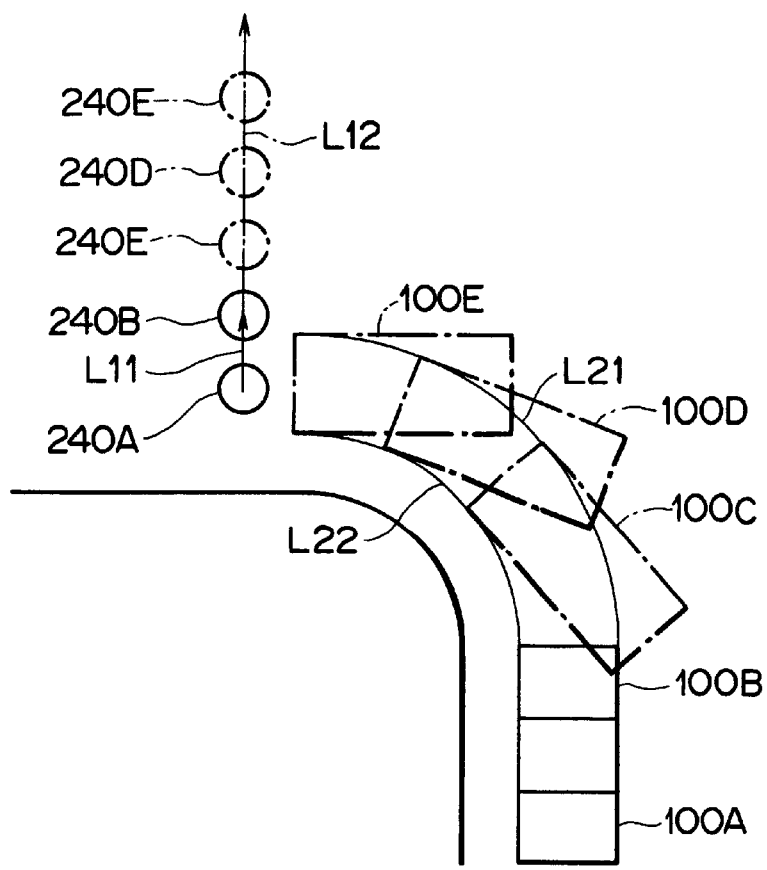
FIGS. 11A and 11B are views for explaining the decision of danger carried out the CPU.
Figure 11B:
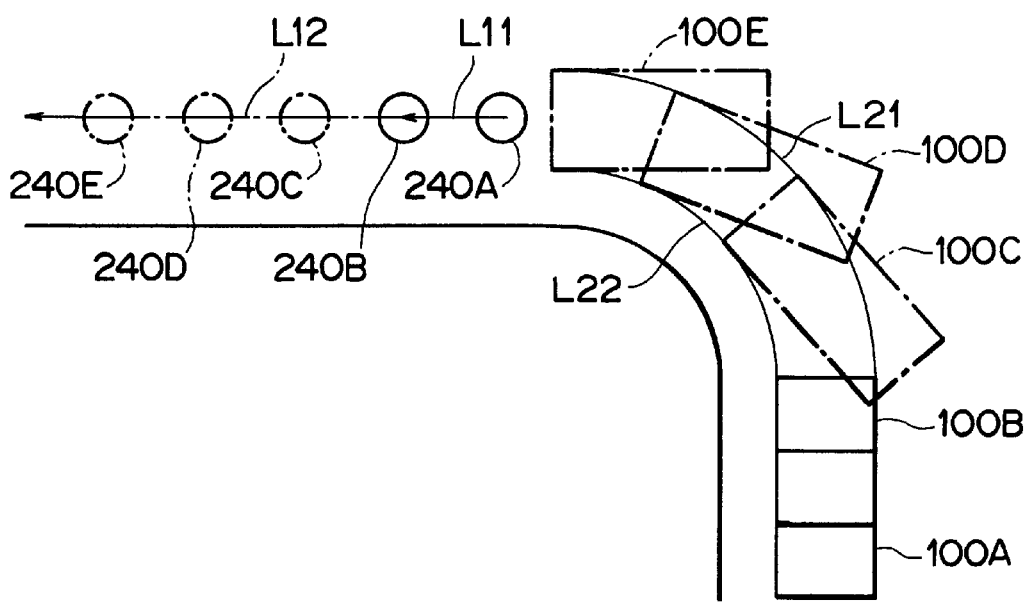

In step S18, on the basis of the expected positions 240C, 240D, 240E, . . . of the object after ΔT1, ΔT2, ΔT3, . . . computed in step S16 and the expected positions 100C, 100D, 100E of the vehicle after ΔT1, ΔT2, ΔT3, . . . computed in step S14, it is decided whether there is danger of collision therebetween. Specifically, when there is an object which is approaching the vehicle (FIG. 10A) or an object which stands still within the expected locus of the vehicle (FIG. 10B), it is determined that there is danger of collision (YES). The processing by CPU 51 proceeds to step S19. On the other hand, when the object is leaving from the vehicle (FIG. 11A), or when the object is a forward vehicle which runs at the speed equal to or higher than the vehicle at issue (FIG. 11B), it is determined that there is no danger of collision. Thus, the processing returns to step S6.

As described above, since the danger of collision is determined taking not only the expected position of the vehicle but also that of the object, it can be determined accurately.

Further, in step S19, the expected timing of collision is computed by CPU 51 on the basis of the expected positions 240C, 240D, 240E, . . . of the object after ΔT1, ΔT2, ΔT3, . . . and the expected positions 100C, 100D, 100E of the vehicle after ΔT1, ΔT2, ΔT3, . . . For example, in the case of FIGS. 10A and 10B, the expected timing of collision is that after ΔT3. In this step, the CPU 51 serves as means for computing the timing of collision.

Subsequently, in step S20 in which a warning is issued, a multi-step buzzer ON signal or audio guidance signal corresponding to the expected timings of collision computed in step S19 is supplied to the speaker 71.

Specifically, if the expected timing of collision is earlier than a prescribed timing, under the decision that there is a high degree of danger, an audio guidance signal is issued so that the speaker 71 announces that "Collision occurs", "Immediately avoid the collision". On the other hand, if the expected timing of collision is not earlier than the prescribed timing, under the decision that there is a low degree of danger, the audio guidance signal is issued so that "Collision may occur", "Pay attention".

An image display signal is issued to display the images picked up by the CCD cameras 11 on the display 61, and a display frame signal is issued to display a display frame encircling the object with possibility of collision. If there are plural objects with possibility of collision, the warning adapted to the object with the most expected early timing of collision is issued.

As described above, by issuing the multi-step warning according to the timings of collision, not only the danger of collision between the vehicle and the object but also the degree thereof is notified to the driver beforehand. Thus, the collision between the vehicle and the object can be prevented.

In the embodiment described above, the positional relationship between the vehicle and the object was detected on the basis of the images picked up by two CCD cameras. However, it may be detected on the basis of the time taken for an ultrasonic signal transmitted from an ultrasonic generator to reach a receiver or for laser light emitted from a laser light source to reach the receiver. In this case, the ultrasonic generator or the laser light source are mounted on the vehicle instead of the two CCD cameras 11.

However, the laser light or ultrasonic signal permits the relative position of only one object nearest to the vehicle to be detected. In addition, in the embodiment described above, the objects detected at timing t and timing t+Δt were correlated on the basis of the images picked up by the CCD cameras 11. However, in the detection of the object position using the laser light and the ultrasonic signal, it is difficult to decide whether or not the objects detected at a time interval Δt are the same object. Therefore, in order to decide the danger between the vehicle and the object more accurately, it is preferred to detect the relative positions of the vehicle and objects on the basis of the images picked up by the CCD cameras 11 capable of detecting the relative positions of all the objects and the vehicle as in the embodiment described above.

Further, in the embodiment described above, the danger of collision between the object and the vehicle was determined on the basis of the expected positions of the object after ΔT1, ΔT2, ΔT3 taking the speed and expected locus of the object in consideration, . . . and the expected positions of the vehicle after ΔT1, ΔT2, ΔT3 taking the speed and expected locus of the vehicle into consideration. However, when the object which approaches the vehicle is detected on the basis of the expected loci of the object and vehicle, it may be determined that there is danger without taking the speeds of the object and vehicle into consideration. In this case, the expected loci must be computed taking a difference between the inner and outer wheels into consideration. However, there is a case where there is no danger of collision according to the speeds of the object and vehicle even when the object approaches the vehicle. Therefore, in order to determine the danger of collision between the vehicle and the object more accurately, it is preferred to determine the danger of collision on the basis of both expected positions of the vehicle and the object as in the embodiment described above.

In the embodiment described above, the helm detecting unit 2 and vehicle speed detecting unit 3 were adopted as the movement quantity. However, for example, the GPS or gyrocompass may be used to detect the movement quantity during a prescribed time Δt. Further, in the embodiment described above, the operation of periphery detection is started when the ignition switch is turned on. However, when a winker is lit, or a car navigation instructs right-turning or left-turning, the operation is started under the decision of right-turning or left-turning, and the operation may be ended when it can be regarded as the right-turning or left-turning has been completed on the basis of the turning information produced from the helm detecting unit 2b. In this case, the side is monitored only at the time of right-turning or left-turning. During the other case than the right-turning or left-turning, the CCD cameras 11 may be oriented rear sideward to monitor the rear during the driving or parking.

Further, in the embodiment described above, the ROM within the μCOM 5 was adopted as a recording medium storing a processing program of determining the danger of collision for the vehicle. For example, a device capable of storing the processing program such as a memory device, magnetic disk device, or an optical disk may be adopted as the recording medium. The periphery monitoring apparatus can be proposed in which the storage medium has only to be set to start the processing program.

What is claimed is:

1. A periphery monitoring apparatus for a vehicle traveling on ground comprising:
   object position detecting means having an in-vehicle monitoring means for monitoring the periphery of the vehicle to produce a monitoring signal representative of an environmental condition, said object position detecting means for detecting the positions of an object on coordinates set with respect to the position and monitoring direction of said monitoring means and at prescribed time intervals on the basis of said monitoring signal;

movement quantity detecting means for detecting the position and movement quantity of said monitoring means in the monitoring direction which moves for a prescribed time while the vehicle moves;

expected object locus computing means for computing a real locus of said object on the basis of the positions of said object and said movement quantity of the monitoring means and computing an expected locus of said object on the basis of said real locus of the object;

expected vehicle locus computing means for computing an expected locus of the vehicle; and danger determining means for determining whether or not there is a danger of collision between the object and the vehicle on the basis of both the expected loci of the object and the vehicle.

2. A periphery monitoring apparatus for a vehicle traveling on ground according to claim 1, wherein said monitoring means is an image pick-up means which produces a plurality of image signals which are obtained by picking up the periphery of the vehicle from two positions apart from each other by a prescribed distance, and said object position detecting means detects the positions of the object on the basis of the plurality of image signals produced from said image pick-up means.

3. A periphery monitoring device for the vehicle according to claim 2, further comprising:

means for detecting a speed of the object on the basis of said real locus of the object; and means for detecting a speed of the vehicle, wherein said danger determining means whether or not there is a danger of collision between the object and the vehicle on the basis of both the expected position of the object computed on the basis of the expected locus and speed of the object and the expected position of the vehicle computed on the basis of the expected locus and speed of the vehicle.

4. A periphery monitoring apparatus for the vehicle according to claim 2, wherein said object position detecting means detects each of a plurality of objects on the coordinates when they are picked up by said image pick-up means;

said expected object locus computing means distinguishably computes an expected locus of each of said objects; and danger determining means for determining whether or not there is a danger of collision between the object and the vehicle on the basis of both the expected loci of each of said objects and the vehicle.

5. A periphery monitoring apparatus for the vehicle according to claim 4, further comprising:

collision expected time computing means for computing an expected collision time on the basis of said expected position of the object and said expected position of the vehicle when said danger determining means determines that there is a danger; and warning issuing means for issuing multi-step warnings according to said collision expected time.

6. A periphery monitoring apparatus for the vehicle according to claim 4, further comprising:

collision expected time computing means for computing an expected collision time on the basis of said expected position of the object and said expected position of the vehicle when said danger determining means determines that there is a danger; and warning issuing means for issuing multi-step warning according to said collision expected time.

7. A periphery monitoring apparatus for the vehicle according to claim 1, further comprising warning means for issuing a warning when said danger determining means determines that there is a danger.

8. A recording medium containing a processing program for determining a danger of collision of a vehicle traveling on ground and an object by a computer, said processing program to be executed by said comprising the steps of:

detecting positions of an object on the periphery of the vehicle at prescribed time intervals;

computing an expected locus of the object on the basis of the positions of the object detected by said object position detecting means;

computing an expected locus of the vehicle; and determining whether or not there is a danger of collision between the object and the vehicle on the basis of both the expected loci of the object and the vehicle.

9. A recording medium containing a processing program for determining a danger of collision of a vehicle traveling on ground and an object by a computer, said processing program to be executed by said computer comprising the steps of:

acquiring a monitoring signal representative of an environmental condition produced from an in-vehicle monitoring means for monitoring the periphery of the vehicle;

detecting the positions of an object on coordinates at prescribed time intervals on the basis of said monitoring signal;

detecting the position and movement quantity of said monitoring means in a monitoring direction which moves for a prescribed time while the vehicle moves;

computing a real locus of said object on the basis of the positions of said object and said movement quantity of the monitoring means;

computing an expected locus of said object on the basis of said real locus of the object;

computing an expected locus of the vehicle; and determining whether or not there is a danger of collision between the object and the vehicle on the basis of both the expected loci of the object and the vehicle.

* * * * *